United States Patent [19]

Sallis

[11] 3,962,638
[45] June 8, 1976

[54] DATA TRANSMISSION OVER VOICE BANDWIDTH OF FM RADIO CHANNEL

[75] Inventor: Jack B. Sallis, New Orleans, La.

[73] Assignee: Shell Oil Company, Houston, Tex.

[22] Filed: Aug. 5, 1974

[21] Appl. No.: 494,595

[52] U.S. Cl. ................................ 325/45; 325/5; 325/7; 325/22; 325/186; 343/180
[51] Int. Cl.² ........................ H04B 1/00; H04B 7/00
[58] Field of Search ................ 325/5, 7, 8, 15, 18, 325/21, 22, 23, 45, 51, 53, 185, 186; 343/175, 176, 180, 205, 207; 340/177 R, 207 R, 207 P

[56] References Cited
UNITED STATES PATENTS

| | | |
|---|---|---|
| 3,210,665 | 10/1965 | Street.................................... 325/22 |
| 3,315,164 | 4/1967 | Ferguson, Jr. et al................ 325/15 |
| 3,336,444 | 8/1967 | Piechocki ............................ 325/15 |
| 3,426,278 | 2/1969 | Van Der Valk .................... 343/175 |
| 3,644,832 | 2/1972 | Sherman, Jr......................... 325/186 |
| 3,745,462 | 7/1973 | Trimble ............................... 325/22 |

Primary Examiner—Robert L. Griffin
Assistant Examiner—Jin F. Ng

[57] ABSTRACT

A low cost data transmission method and system for transmitting digital control instructions from a central control or data processing location to equipment operated in some remote area and for return of digital data describing conditions of the remote operations using frequency modulated radio transceivers.

3 Claims, 8 Drawing Figures

AMPLITUDE
CHARACTERISTIC
ENTIRE CIRCUIT-
MICROWAVE AND
RADIO LINKS

AMPLITUDE
CHARACTERISTIC
RADIO LINK ONLY

AMPLITUDE
CHARACTERISTIC
MICROWAVE
CHANNEL ONLY

RELATIVE DELAY CHARACTERISTIC ENTIRE CIRCUIT - MICROWAVE AND RADIO LINK

RELATIVE DELAY CHARACTERISTIC RADIO LINK ONLY

RELATIVE DELAY CHARACTERISTIC MICROWAVE CHANNEL ONLY

DATA TRANSMISSION OVER VOICE BANDWIDTH OF FM RADIO CHANNEL

BACKGROUND OF THE INVENTION

The voice bandwidth communications channel, roughly 300 to 3000 Hz is a common industry standard. Accordingly, a variety of modems are offered to encode digital data onto a voice channel at one point and to decode that digital data elsewhere at rates in bits per second of 600, 1200, 2000, 2400, 3600, 7200, or faster. In general, modems for higher bit rates are more complex and costly; they introduce and interpret more subtle channel signal variations; and, they require communication channels having more stringent amplitude and relative delay characteristics. In many situations the quantity or nature of data to be sent will warrant the use of more sophisticated modems and careful attention to channel transmission parameters.

In situations involving only a few locations the cost of the transmission channel can be justified while in other situations it cannot. This is particularly true in the case of offshore shallow water platforms equipped with crude oil treating facilities. On the average, approximately twenty-five nearby producing wells at randomly spaced individual well jackets are associated with a treating facility platform. A separate flow line from each well buried beneath the ocean floor conducts produced oil, water and gas into the production header manifold of treating facility. Normally the wells use injected gas for artificial lift and are subject to liquid flow rates that fluctuate widely with time. Devices are available for indicating liquid flow rate in each incoming flow line at the treating facility. While the flow devices are available at low cost, reliable communications capable of high speed digital transmissions are not. A communication system would allow frequent real time sampling of instantaneous flow rates from which the computer could determine the smoothed average liquid flow rate of each well.

In a typical shallow water field all platforms lie within an area approximately circumscribed by a semi-circle of ten miles radius about a central facility and pipeline terminal located on the beach. A microwave terminal station at the central facility is part of a system extending all the way back to the computer location 400 miles away. Thus, with suitable communications readily available between central facility and the computer center, only the short-distance communications between central facility and the twenty platforms remains.

If only a few platforms were involved an extension of the microwave system might afford a ready solution. In the above example the cost of twenty microwave stations and the potential for self-interference of that much microwave in so small an area eliminates microwave from consideration. Submarine cable was considered and rejected on the basis of exorbitant maintenance cost and limited reliability expected as a result of construction activities, fishing and boats anchoring within the field. Attempts have been made to use separate radio frequency channel assignments for each platform. A single transmitter was installed on the central platform for working into a receiver on each satellite location with separate receivers being required at the central location to handle individual satellite transmitted frequencies. These systems, operating with transmitters continuously keyed, experience some difficulty handling 600 bits per second data. On the scale of twenty platforms a separate frequency for each location probably could not be justified to the satisfaction of the Federal Communications Commission.

BRIEF SUMMARY OF THE INVENTION

It has been discovered that conventional FM two-way radio transmitters can be modified to provide low cost, high speed digital data communication. The conventional FM two-way radio transmitter develops frequency modulation by a process more accurately described as phase modulation. An oscillator operated at a sub-multiple of the carrier frequency has its output coupled to a phase modulator into which a message signal composed of frequencies within the voice band is also injected. Within the phase modulator circuit the steady oscillator output signal and the message signal interact to produce an output at the oscillator frequency that is phase shifted by an amount proportional to the time rate of change of the message signal. Thus, phase modulation produces deviation proportional to both modulating signal voltage and modulating signal frequency. Final output frequency, deviation and power are attained by the action of frequency multiplier and amplifier stages following the phase modulator. The 6-decibles per octave pre-emphasis nominal transmitter audio frequency characteristic associated with this equipment is a natural result of the phase modulation process used. Satisfactory voice reproduction is accomplished by use of a 6-decible per octave de-emphasis circuit in the audio section of companion receivers.

Amplitude distortion resulting from manufacturers' losse specifications in regard to their adherence to the nominal pre-emphasis and de-emphasis curves has little effect on speech intelligibility and any delay distortion resulting from non-linearities of the modulation process or treatment of recovered audio would be totally undiscernible to the human ear. Nevertheless, any substantial improvement of the data rate capability of FM radio transceivers would depend upon reducing these amplitude and delay distortions.

It was discovered that at least one transceiver contained a circuit for injecting low frequency tones, below 300 Hz, directly into the transmitter's integrated circuit oscillator module. Such tones actually vary the crystal oscillator frequency, producing true frequency modulation, for the purpose of selectively activating the audio circuit of receivers equipped for tone squelch. Tests have shown a very flat deviation characteristic over the 300 to 3000 Hz band and peak modulation levels up to plus and minus 5 kHz do not alter the center frequency of the modulated carrier. Thus, data injected at the tone squelch circuit feed point can be transmitted relatively free of distortion.

A receiver that will faithfully reproduce data linearly modulated on the transmitted carrier requires linear treatment of receiver discriminator output by the successive audio stages. In the present embodiment 600-OHM balanced line receiver data output was desired and the required linearization of the receiver was obtained by removal of the capacitor within the auxiliary line output amplifier responsible for nominal 6 db per octave de-emphasis.

In a bench test using a pair of transceivers modified as above a continuous stream 2400 bits per second data output from the send section of a modem using the offset quadraphase shift key technique was injected into the transmitter input of one unit. The receiver section of the same modem was connected to the receiver of the second unit. Test equipment connected to the modem provided input data generation, comparison bit for bit of output data to input data and cumulative bit error count display. Error-free runs of twenty minutes duration were commonplace, indicating that the radio channel transmission characteristics were entirely adequate for the intended application.

The present invention minimizes the number of radio carrier frequency assignments required for communications when automating an off-shore field. Only one frequency is used by a transmitter interfaced with a microwave channel at the field central facility for transmitting to all platforms and a second frequency is used by all platforms for transmitting back to field central facility. This also reduces the radio requirements to a single receiver and a single transmitter at each location, including field central facility, while eliminating interference or overload desensitization of any receiver from its locally associated transmitter.

In normal data transmissions the system traffic would consist of a short message outgoing from the central computer addressed to a particular location and a similarly short response message from the location, one for one in a repetitive interrogate and respond polling sequence. In this type of operation a very fast turnaround is required to handle the data load. Thus, each receiver must be maintained continuously ready to receive and each transmitter must be capable of very fast rise and stabilize time. Further, the platform transmitters require sufficiently short turn off and decay time such that the receiver at central facility would not have a transmitter carrier from one platform interfering with that from another.

Receiver modifications included removal of the receiver muting feature which would have muted the receiver each time the associated transmitter was keyed and addition of an antenna duplexer to replace the antenna switching relay. These changes were made to maximize receiver availability and to minimize any degradation of receiver performance that might be caused by the locally associated transmitter.

Transmitter modifications included provision of constant power to the oscillator, addition of a fast acting mercury-wet relay to handle power switching to the high level transmitter stages, and addition of a second fast mercury relay as a sensitive pilot for the power relay. By constantly powering the oscillator ahead of the constantly powered low level stages a stable, immediately available drive source is assured, and use of fast relays to key high level stages provides sharp on and off transmitter keying. Elimination of the antenna switching relay, mentioned in connection with receiver modifications, further minimizes transmitter rise time.

BRIEF DESCRIPTION OF DRAWINGS

The present invention will be more easily understood from the following detailed description of a preferred embodiment when taken in conjunction with the attached drawings in which.

PREFERRED EMBODIMENT

Figure 1:
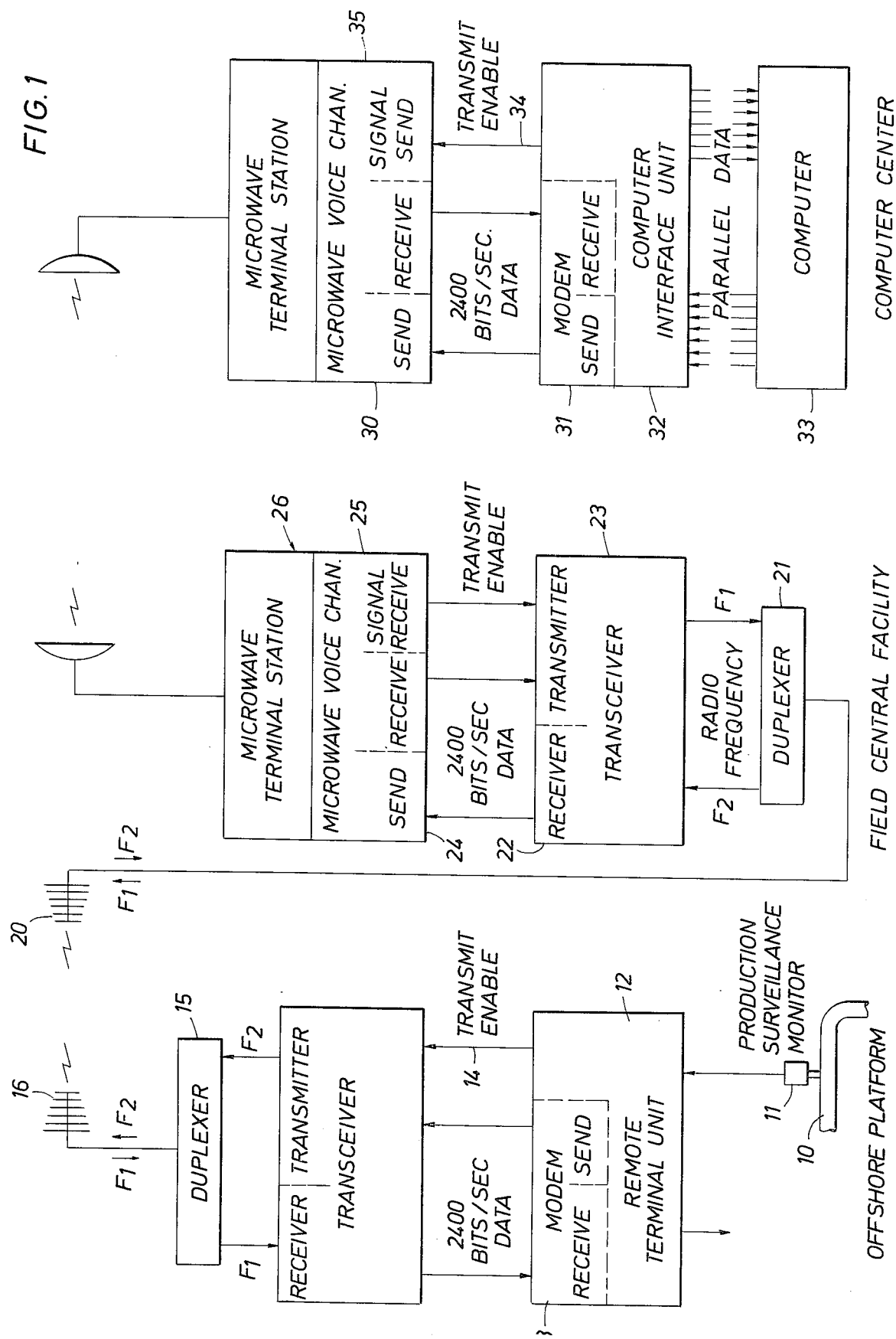
FIG. 1 illustrates the overall system from a typical remotely located platform of an offshore oil field to a computer center.

Referring now to FIG. 1, at a typical offshore platform there is shown a flowline 10 from a producing well through which the well stream is conducted into a treating facility on the platform. Mounted on the flowline is a production surveillance monitor 11 such as disclosed in copending application Ser. No. 356,650, filed on May 2, 1973 now U.S. Pat. No. 3,834,227. The analog electrical signal from the production surveillance monitor is supplied to a remote terminal unit 12 as an electrical current of magnitude proportional to liquid flow rate in the flowline as it passes the point at which the production surveillance monitor is attached. The remote terminal unit converts the analog signal amplitude into a corresponding binary digital number. Upon request from the computer, the remote terminal will determine the binary number corresponding to well flow rate, place that number in the proper message format and the modem 13 will encode the binary message for serial transmission as an audio frequency tone or tones. The output of the modem carries the information associated with each message bit in the form of amplitude, phase, or frequency shifts that can be accommodated within a voice bandwidth circuit. For example, a phase shift modem may be used to transmit 2400 bits per second in the offset quadraphase shift key mode. Just prior to release of the modem to send the message a transmit enable signal is supplied on the lead 14 by the remote terminal unit to turn on the radio transmitter. The modem tone output causes frequency modulation of the keyed transmitter carrier. Transmitter output power passes through the duplexer 15 to the antenna 16, is radiated, and received on the radio antenna 20 at field central facility. The radio carrier frequency transmitted from a platform to central facility is shown as F2 and is received at central facility. The received carrier frequency passes through the duplexer 21 into the receiver section 22 of the transceiver 23. The output of the receiver is a reconstructed signal essentially identical to the original signal generated by the modem 13 and the platform remote terminal unit 12. The signal enters the send portion 24 of a microwave voice channel 25 provided at the field central facility microwave terminal station 26. At the far end of the microwave system the data signal is recovered by the receive section of a corresponding microwave voice channel unit 30. The microwave receive channel output is connected to the modem 31 of the computer interface unit 32. The receive section of the modem 31 translates the phase shifts of the received signal into serial binary bits which the computer interface unit 32 accumulates to reconstruct the message sent from the offshore platform. The message, serially composed within the computer interface unit, can be shifted rapidly into the computer 33 by parallel transfer of bits.

At a time set by the computer's program the computer will call for data on a particular well, or group of wells. The appropriate request message from the computer is sent by parallel shift of bits into the computer interface. When loaded, the computer interface will generate a transmit enable signal on lead 34 just prior to release of the modem 31 to transmit data. The transmit enable signal is connected to the microwave voice channel signal send circuit 35, causing regular channel signalling section of the microwave system to transmit an enable signal to the signal receive circuit of the voice channel at field central facility and reproduce there a transmit enable signal to key the central facility radio transmitter. The close-following message from the computer interface modem is transmitted through the microwave voice channel to the radio transmitter at field central facility. The transmitter output frequency $F_1$ is modulated by the modem message, passes through the duplexer to the antenna 20 and is radiated and received by all platform receivers. All platform modems start decoding the message into binary bit form and recover, at least, the first part of the message containing the address code of the desired remote terminal unit. Only the addressed remote terminal unit processes the request message, converts the proper analog signal or signals into digital form, composes a message of standard format, generates a transmit enable signal and releases its modem to send the message. At end of message the transmit enable signal is removed, turning off its associated radio transmitter. A control message from the computer would be handled in similar manner. Only the addressed remote terminal unit would process the message, select and operate appropriate relays or other circuits to effect the requested control function, and send a confirming message that the command had been executed. The remote terminal unit 12 and computer interface 32 may be commercial units available from various manufacturers such as Model S-701 remote terminal units of TRW Controls, Inc., 5610 Parkersburg, Houston, Texas.

Figure 2:
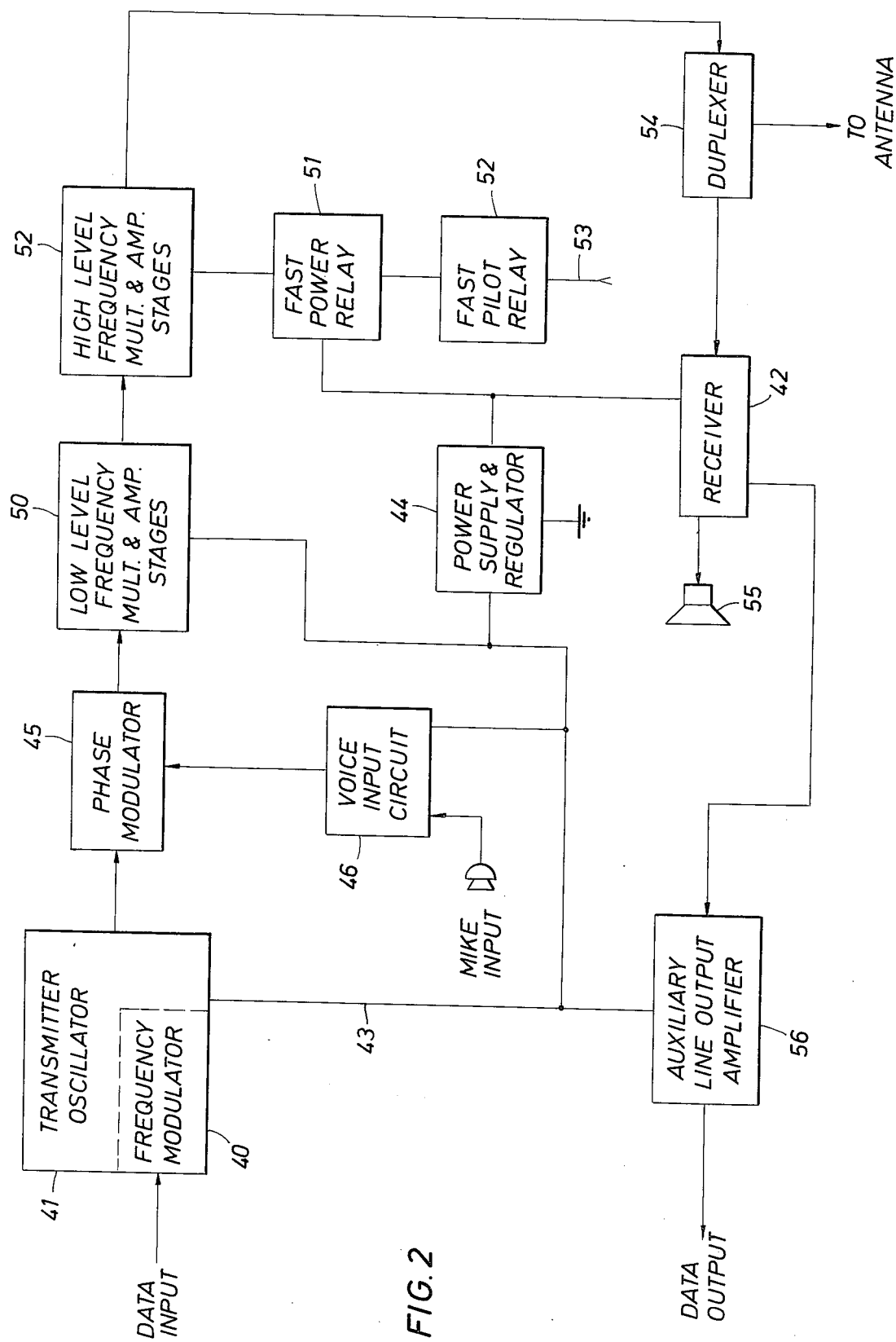
FIG. 2 is a block diagram of a radio transceiver suited to handle relatively high data bit rates.

Referring now to FIG. 2, there is shown a block diagram of a modified transceiver which renders it suitable to interface with the microwave voice channel at field central facility or to interface with a remote terminal unit on each platform. The transceiver may be used in a system with any number of platforms to provide a data transmission link between central facility and each platform.

The transceiver is a conventional frequency modulated voice communication transceiver using phase modulation. In addition, the transmitter has provisions for injecting one of a number of standard precise low frequency tones into the oscillator 41 to produce true frequency modulation of the transmitter output. Such provisions and tone injection, an optional tranmitter feature, would serve to selectively open the audio circuit of receivers equipped with tone squelch option and a given tone frequency assignment. Receiver 42 is not so equipped; however, the presence of the tone injection circuit in the transmitter provides a means whereby a signal voltage can be injected to produce true frequency modulation of the transmitter.

In the standard transceiver a voltage is applied to the oscillator 41 by a push-to-talk circuit that is activated by microphone switch whenever the operator wishes to transmit. The transceiver must be modified to supply a constant voltage 43 from the power supply 44 so that the first stages of the transmitter portion of the transceiver are always powered. This insures that the transmitter can transmit at the speed required without delay.

The oscillator 41 is coupled to a passive phase modulator circuit 45 in which modulation by voice frequencies, which have been extensively processed in a voice circuit 46, is accomplished. In the absence of microphone input the drive signal out of the oscillator 41 is unaffected by its passage through the phase modulator to the following stages. Likewise, the data modulated oscillator output passes unaffected through the phase modulator 45 in the absence of injected voice.

Low level frequency multiplier and amplifier stages 50 following the phase modulator 45 are continuously powered from the power supply 44. Thus, in the modified unit a continuous source of stable drive is maintained to the input of the following high level stages. Normally, the high level stages receive keyed power through auxiliary contacts of an antenna switching relay in unison with the push-to-talk operation of the microphone switch. This same source of power remains in the modified unit and is employed for voice transmission. In order to meet fast switching requirements of a data transmission application an alternate source of power to the high level stages is provided. This alternate source uses a fast acting mercury-wet power relay 51 actuated by a second fast mercury relay 52 used as a sensitive pilot relay for control of the power relay. A low voltage transmit enable signal on lead 53 supplied by the remote terminal unit 12 in the case of a platform mounted unit or from the microwave voice channel signal receive in the case of the central facility unit will operate pilot and power relays in quick succession to key power to the high level stages. Since the remainder of the stages are always powered the transmitter power output rise time is minimized. The transmitter power output is transmitted through a duplexer 54 to the antenna 16. The effects of these fast-rise transmitter modifications are such that only a few milliseconds of transmit enable signal lead time is required to prepare the transmitter to pass the data message. This permits a fast turnaround of the interrogate and respond cycle which significantly increases the message rate capability of this type of data transmission system.

Signals received on the antenna 16 pass through the duplexer 54 into the receiver 42 which is continuously powered by the power supply 44. The receiving of a signal opens the receiver squelch circuit and detected components of frequency modulation present in the radio frequency received signal appear in the speaker 55 output with standard 6-decibels per octave de-emphasis. Detected components of frequency modulation out of the discriminator of the receiver serve to drive an added auxiliary line output amplifier 56. The signal from the discriminator circuit supplied to the line output amplifier has a flat amplitude characteristic. The auxiliary line output amplifier also has a provision for gating to the receiver squelch circuit such that, in the absence of a received signal, noise from the discriminator is not passed through the data output.

Figure 3A:
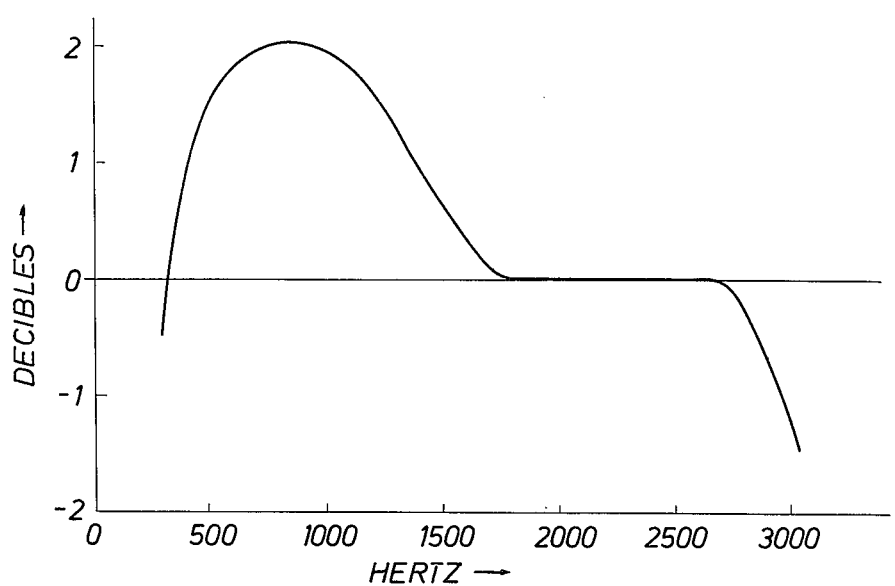
FIG. 3 is a set of curves showing amplitude characteristics of the overall transmission channel, radio link alone and microwave voice channel link alone.
Figure 3B:
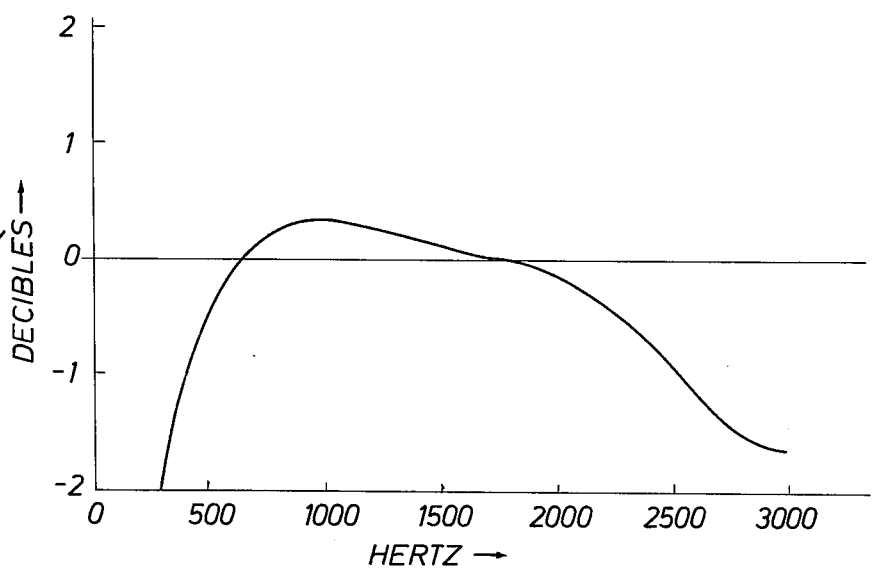
Figure 3C:
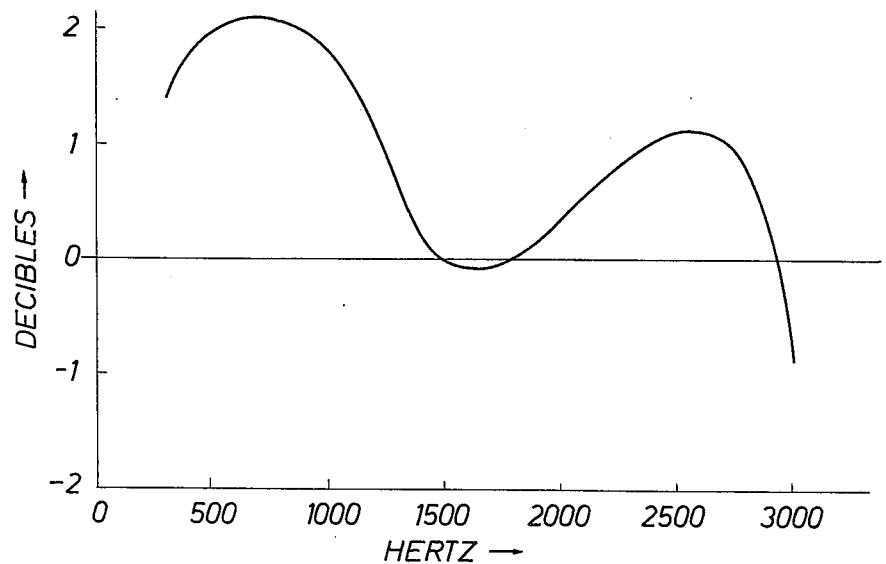

Referring now to FIG. 3, there is shown the actual amplitude characteristic for the overall transmission path that is flat within plus 2 and minus 1.5 decibels. The radio link alone is flat within plus 0.3 and minus 2 decibels; and, that for the microwave channel alone is flat within plus 2.1 and minus 0.8 decibels as shown in FIGS. 3b and 3c. The radio link amplitude characteristic is slightly better than that of the microwave circuit, although further improvement could probably be effected by close examination of the auxiliary amplifier for minor changes to circuits designed for less demanding, voice-only service.

Figure 4A:
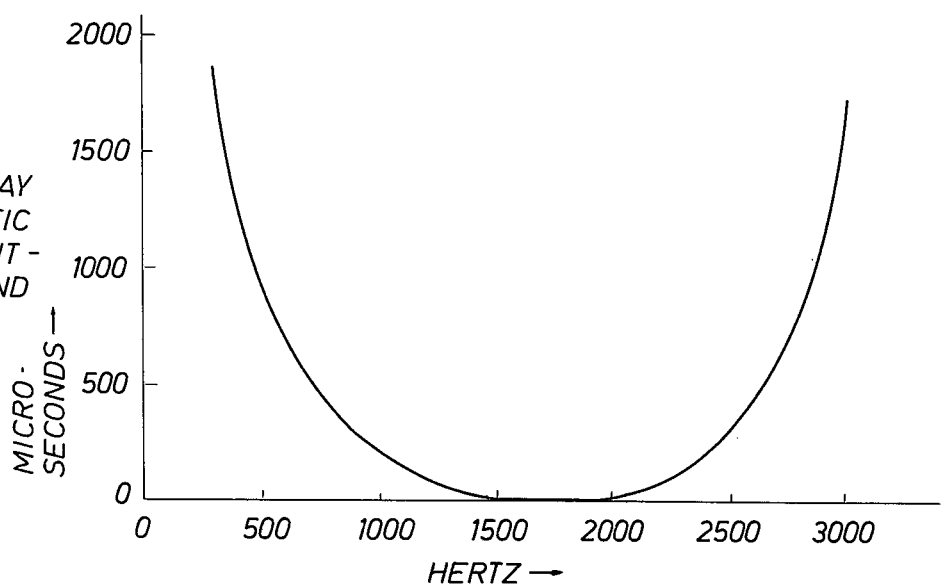
FIG. 4 is a set of curves showing relative delay characteristics overall, radio link alone, and microwave channel link alone.
Figure 4B:
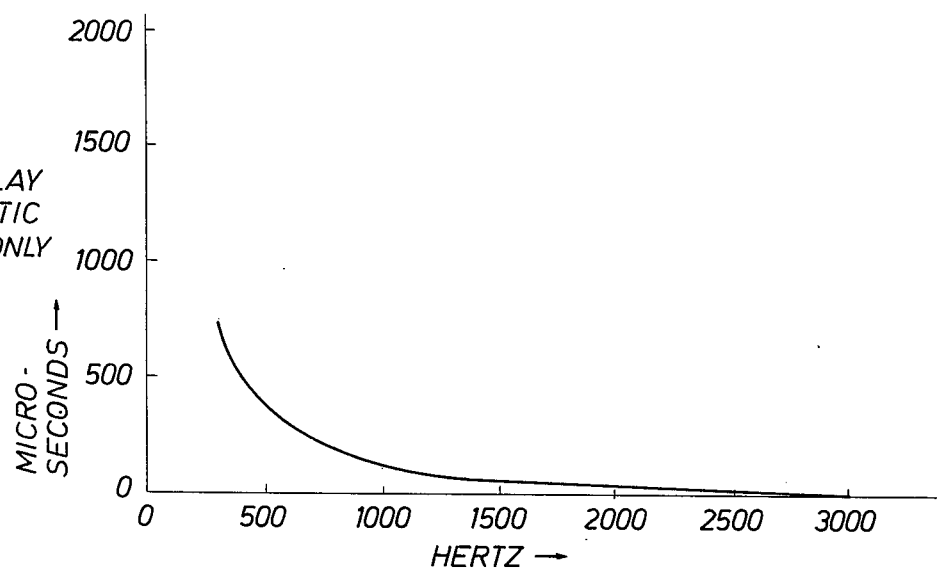
Figure 4C:
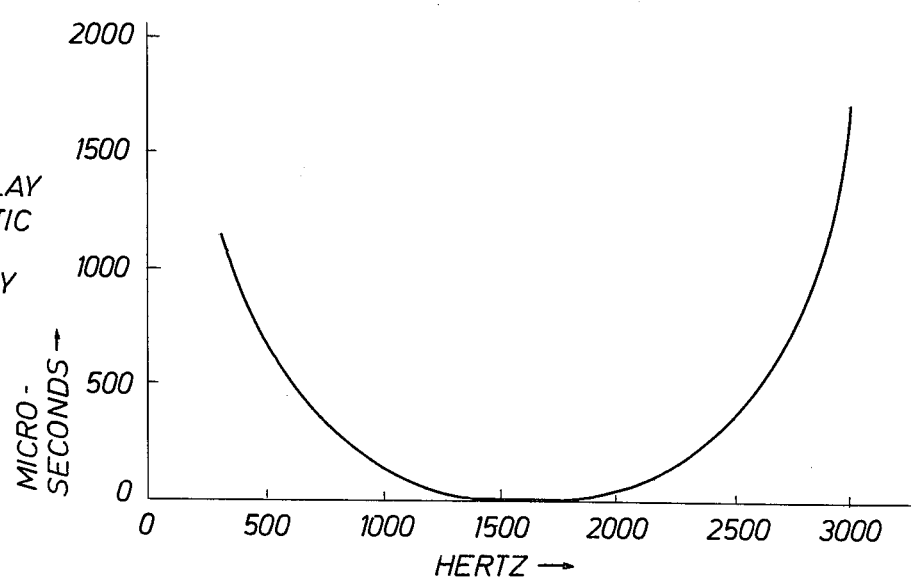

Referring now to FIG. 4, there is shown the relative delay characteristic for the overall transmission path from maxima of 1900 microseconds at 300 Hertz and 1700 microseconds at 3000 Hertz. The radio relative delay shows a maximum of only 750 microseconds at 300 Hertz and decreases to zero at 3000 Hertz while the microwave channel characteristic shows maxima of 1150 microseconds at 300 Hertz and 1700 microseconds at 3000 Hertz.

I claim as my invention:

1. A data transmission system located at a remote location for transmitting digital data produced at the remote location to a central station and receiving digital data in the form of modulated tone transmitted from said central station, said system comprising:
   a remote terminal unit;
   a frequency modulated radio transceiver having both a receiver and transmitter circuit, said transmitter circuit having first circuit means for frequency modulating its transmitted carrier free of pre-emphasis with a relatively flat deviation versus modulating frequency characteristic and minimal phase delay distortion, said first circuit means being coupled to said remote terminal unit;
   a power supply, said power supply being permanently coupled to the initial stages of the transmitter circuit including said first circuit means said receiver circuit being coupled to said power supply to receive signals transmitted to said remote location from said central station;
   a modem, said modem being coupled to said remote terminal unit and designed to convert the digital data produced at said remote location to a modulated tone, said modem being coupled to said first circuit means of the transmitter whereby said modulated tone modulates the transmitter frequency;
   the modem in addition being coupled to the receiver circuit to convert a modulated tone received from said central station into digital command signals, said digital command signals being supplied to said remote terminal unit to control said remote terminal unit; and
   a second circuit means, said second circuit means being coupled to said remote terminal unit and disposed to couple said power supply to the final transmitting stages of said transmitter, said remote terminal unit actuating said second circuit means in response to one of said digital command signals.

2. The data transmission system of claim 1, wherein said second circuit means comprises two relays, the first relay being a sensitive power relay disposed to operate the second relay, said second relay being a fast acting power relay.

3. A data transmission system for transmitting digital data in the form of modulated tone from a central facility to a plurality of offshore production platforms and transmitting digital data produced at said plurality of platforms to said central facility, said system comprising:
   a frequency modulated radio transceiver at each platform, all of said transceivers having the same transmit and receive frequency, said transceivers in addition having transmitting and receiving portions, said transmitting portion having an input circuit means for frequency modulating the transmitted carrier frequency free of pre-emphasis and a flat deviation versus modulating frequency characteristic and minimal relative phase delay;
   a remote terminal unit at each platform coupled to both the transmitter and receiver portion of said transceiver, said remote terminal unit including a modem for translating digital data produced on said platforms to a modulated tone and converting a modulated tone received from said central facility to digital data, the modulated tone produced by said modem being supplied to said input circuit means;
   a power supply at each platform, said power supply being coupled to the receiver portion of said transceiver and the initial stages of the transmitter including said input circuit means;
   a switch circuit, said switch circuit being disposed to couple said power supply to the remaining portion of the transmitter portion of said transceiver, said switch circuit being coupled to and actuated by said remote terminal unit in response to a modulated tone received from said central facility;
   the receiver portion of said transceiver being coupled to said remote terminal unit to supply said modulated tone received from said central facility to said remote terminal unit to operate said modem to supply said modulated tone to said input circuit means in response to said modulated tone; and
   a transceiver at said central facility having the same transmit frequency as the receivers on said platforms whereby said central facility can contact all of said platforms.

* * * * *